Patented Nov. 24, 1936

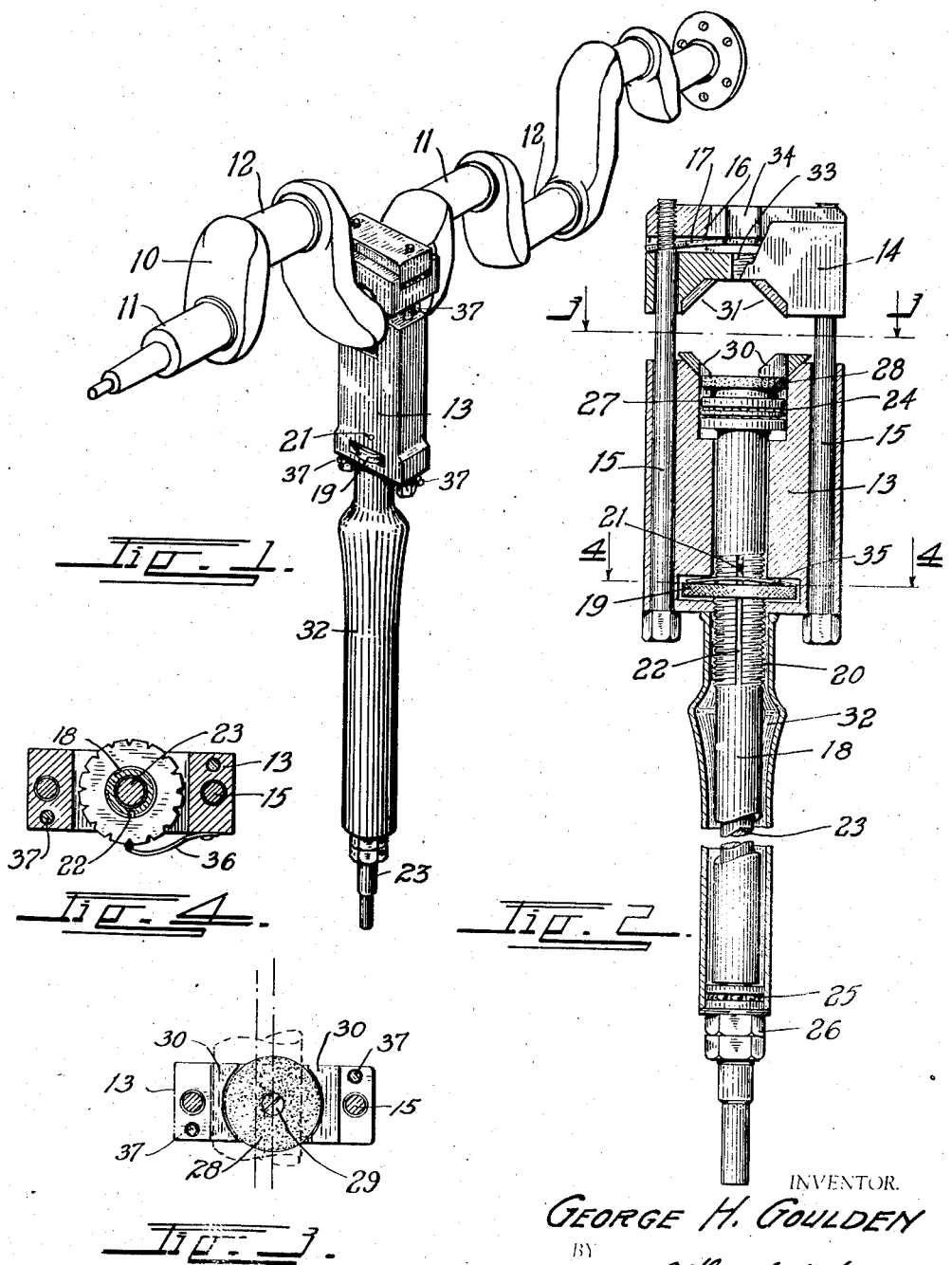

2,061,764

UNITED STATES PATENT OFFICE 2,061,764

CRANKSHAFT GRINDER

George H. Goulden, Denver, Colo.

Application July 16, 1935, Serial No. 31,555

8 Claims. (Cl. 51—241)

This invention relates to a device for grinding the bearing surfaces of automotive engine crank shafts. It is an exceedingly difficult and expensive procedure to remove the crank shaft from an engine in order to regrind or true up the bearing surfaces thereof.

The principal object of this invention is to provide a device which can be attached to the various bearings of a crank shaft without removing the latter from the engine and which will accurately and rapidly true up the bearing surfaces thereof.

Another object of the invention is to provide a device of this character which can be accurately and minutely adjusted to remove any desired amount from the bearing surface to produce an accurate new surface upon the bearing and which will be adaptable to crank shafts of different diameters and widths.

A further object of the invention is to so construct the device that it can be regulated to grind more upon one extremity of the bearing surfaces than upon the other extremity, if desired, so as to accurately align a badly worn or tapered bearing.

Other objects and advantages reside in the detailed construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 illustrates the invention applied to a typical crank shaft.

Fig. 2 is a side elevation thereof, partly in section, illustrating the interior construction.

Fig. 3 is a horizontal cross section, taken on the line 3—3, Fig. 2.

Fig. 4 is a similar section taken on the line 4—4, Fig. 2.

In the specification the cylindrical bearing surfaces upon the crank shaft which rest in the main crank case bearings and the connecting rod bearings will be designated simply as bearings.

In the drawing, a typical crank shaft is indicated at 10 with its main bearings at 11 and its connecting rod bearings at 12. The invention comprises a main housing block 13 to which a head block 14 is held by means of suitable clamp screws 15. The blocks 13 and 14 are notched to receive the crank shaft bearings. It is preferred to have bearing surfaces 30 and 31, formed of hardened steel blocks, inset into the shaft receiving notches formed in the housing block 13 and the head block 14 so that they will withstand wear and will be renewable. The clamp screws 15 are threaded into a cross bar 16 which is separated from the head block 14 by means of a leaf spring 17.

A shaft sleeve 18 passes longitudinally through the housing block 13, and is supported therein upon an adjusting nut 19 threaded upon feed threads 20 upon the sleeve. The nut 19 is positioned in a lateral slot extending through the block 13. A spring washer 35 is preferably placed above the feed nut 19 to hold it against the bottom of its slot so as to remove any lost motion in adjustment thereof. A pin 21 projects from the block 13 into a guide slot or keyway 22 in the sleeve to prevent rotation of the latter.

A grinding shaft 23 extends longitudinally through the sleeve 18 and is supported therein between an upper thrust bearing 24 and a lower thrust bearing 25. Clamping nuts 26 clamp the thrust bearings to the end of the sleeve 18. The upper extremity of the shaft 23 terminates in a grinding head 27 to which a suitable grinding wheel 28 is attached by means of an attachment screw 29. If desired, a handle member 32 may be placed around the shaft sleeve 18.

The housing 13 carries two bearing surfaces 30 positioned at 45° from the vertical, and the head block 14 carries two similar surfaces 31. The shaft 23 may be driven in any desired manner such as from a flexible drive shaft or a portable motor (not shown).

In use, the bottom of the crank case is removed from the automotive engine and the connecting rods are disconnected from the crank shaft. The head block 14 is placed over the bearing to be ground and the device is assembled as shown in Fig. 1. The shaft 23 is rapidly rotated at approximately 3,000 R. P. M. The feed nut 19 is turned to thread the sleeve 18 upwardly until the face of the grinding wheel 28 contacts with the bearing surface. The crank shaft 10 is now rotated, allowing the grinding tool to depend therefrom, and the sleeve is fed upwardly by means of the nut 19 until the bearing has been ground to the desired true diameter.

In placing the device on the bearing, the bolts 15 are drawn sufficiently tight to slightly compress the leaf spring 17. This allows the bearing to rotate between the blocks 13 and 14 against the bearing surfaces 30 and 31. The latter surfaces hold the grinding shaft accurately at right angles to the bearing surface so as to maintain the face of the grinding wheel flat against the surface. As the diameter of the bearing is reduced by grinding, the spring 17 will gradually expand to take up the loss and maintain the contacts at 30 and 31.

The device is designed to grind the full width of the bearing at once, and the grinding wheels 28 are furnished in diameters equal to the full width of various bearings. The head blocks 14 are also furnished in thicknesses equal to the full width of the various bearings so as to accurately hold the grinding wheels centered on bearings of given sizes. The housing block 13 is of a width to fit into the smallest expected bearing.

It is desired to call attention to the fact that the bearing surfaces 30 and 31 are offset to one side of the center line of the grinding shaft 23. This positions the line of contact with the bearing to one side of the center of the grinding wheel, as indicated by the vertical center lines in Fig. 3, so that the shaft is ground throughout the entire length of the line of contact without interference by the position of the attachment screw 29.

A tapped hole 33 may be formed through the head block in alignment with a hole 34 in the head block 16 so that a tube may be threaded into the head block for supplying water or grinding fluid to the shaft if desired. Ordinarily, however, this is not necessary.

For accurate feeding purposes, it is preferred to cut the threads 20 forty threads per inch and to divide the surface of the feed nut 19 into twenty five division notches with a click spring 36 snapping into the division notches. This assures the operator that each click will feed the grinding wheel 28 one one-thousandth of an inch toward the work.

Occasionally a worn bearing will be encountered which has become badly tapered, that is, it is of much smaller diameter at one end than at the other. If the two blocks 13 and 14 are clamped against such a bearing it might result in an inaccurate or tapered grinding. To meet such conditions two relatively long set screws 37 are threaded longitudinally through the housing block 13 at diagonal corners thereof. By threading one of these screws against the head block at the smaller end of a tapered bearing it will prevent the two blocks from being pulled together on the taper of the bearing and will favor the grinding of the larger end of the bearing.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A crank shaft grinding tool comprising: a housing block provided with a V-shaped notch for receiving a crank shaft bearing; a longitudinally movable sleeve extending from the bottom of said notch through said block; a grinding shaft supported in said sleeve; a grinding wheel mounted on said grinding shaft in said notch; means for clamping said bearing in said notch; and means for feeding said sleeve toward said bearing.

2. A crank shaft grinding tool comprising: a housing block provided with a V-shaped notch for receiving a crank shaft bearing; a longitudinally movable sleeve extending from the bottom of said notch through said block; a grinding shaft supported in said sleeve; a grinding wheel mounted on said grinding shaft in said notch; means for clamping said bearing in said notch; threads formed upon said sleeve; and a nut held in said housing block in mesh with said threads to feed said sleeve toward said bearing the edges of said nut projecting through the sides of said block.

3. A crank shaft grinding tool comprising: a housing block provided with a notch for receiving a crank shaft bearing; a longitudinally movable sleeve extending from said notch through said block; a grinding shaft supported in said sleeve; a grinding wheel mounted on said grinding shaft in said notch; means for feeding said sleeve toward said bearing; a notched head block for holding said bearing against said housing block; clamping bolts extending between said head and housing blocks; a nut member threaded on said clamping bolts; and a spring interposed between said nut member and said head block so as to resiliently clamp said blocks against said bearing.

4. A crank shaft grinding tool comprising: a housing block provided with a V-shaped notch for receiving a crank shaft bearing; a longitudinally movable sleeve extending from the bottom of said notch through the opposite face of said block; a grinding shaft supported in said sleeve; a grinding wheel mounted on said grinding shaft in said notch; means for clamping said bearing in said notch; and means for feeding said sleeve toward said bearing, said grinding shaft being positioned to one side of the axis of said V-shaped notch so as to position said grinding wheel to one side of the center line of said bearing.

5. A crank shaft grinding tool comprising: a housing block provided with a notch for receiving a crank shaft bearing; a longitudinally movable sleeve extending from said notch through said block; a grinding shaft supported in said sleeve; a grinding wheel mounted on said grinding shaft in said notch; means for feeding said sleeve toward said bearing; a notched head block for holding said bearing against said housing block; means for drawing said head block toward said housing block; and set screws carried by said housing block for contacting said head block at either side so as to prevent the drawing together of said blocks at either desired side.

6. A crank shaft grinding tool comprising: a housing block provided with a notch for receiving a crank shaft bearing; a longitudinally movable sleeve extending from said notch through said block; a grinding shaft supported in said sleeve; a grinding wheel mounted on said grinding shaft in said notch; means for clamping said bearing in said notch; threads formed upon said sleeve; a nut held in said housing block in mesh with said threads to feed said sleeve toward said bearing said nut projecting beyond the sides of said block; and means for preventing rotation of said sleeve in said housing block.

7. A crank shaft grinding tool comprising: a housing block provided with a notch for receiving a crank shaft bearing; a longitudinally movable sleeve extending from said notch through said block; a grinding shaft supported in said sleeve; a grinding wheel mounted on said grinding shaft in said notch; means for feeding said sleeve toward said bearing; a notched head block for holding said bearing against said housing block, said head block being longitudinally grooved; a cross bar mounted in said groove; a spring interposed between said cross bar and said head block; and a pair of clamp screws extending from said housing block through said head block and threaded into said cross bar so as to clamp said blocks together against a bearing while compressing said spring.

8. A tool for grinding crank shaft bearing surfaces comprising a relatively flat, elongated, rectangular block having a thickness substantially equal to the width of a crank shaft bearing; oppositely inclined surfaces extending transversely across the inner extremity of said block so as to form a V-shaped notch therein for receiving a crank-shaft bearing surface, there being a counter-bore extending longitudinally into said block from the bottom of said notch and a shaft bore extending longitudinally through said block from the bottom of said counter-bore; a bearing sleeve extending from said counter-bore through said shaft bore and projecting from the outer extremity of said block; a thrust bearing on the inner extremity of said shaft within said counterbore; a grinding wheel in said counterbore; a drive shaft extending from said wheel through said thrust bearing and through said sleeve and projecting beyond the outer extremity thereof; threads formed on said shaft within said block, there being a slot formed completely through said block opposite said threads; a relatively flat nut positioned in said slot and threaded upon said sleeve, said slot acting to prevent longitudinal movement of said nut; means for preventing rotation of said sleeve in said block; and means for clamping the inclined surfaces of said V-shaped notch against a bearing surface of a crank shaft.

GEORGE H. GOULDEN.